Nov. 26, 1935.  W. D. LEWIS  2,022,511
DAMPER REGULATOR
Filed April 3, 1935
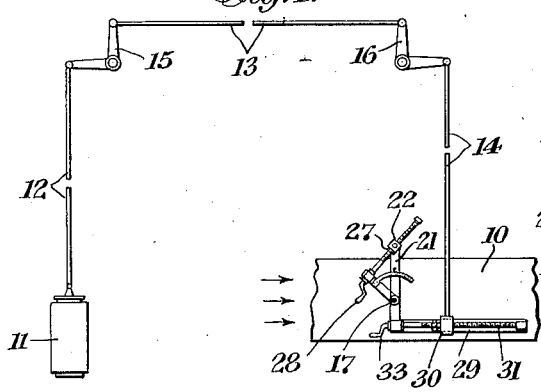
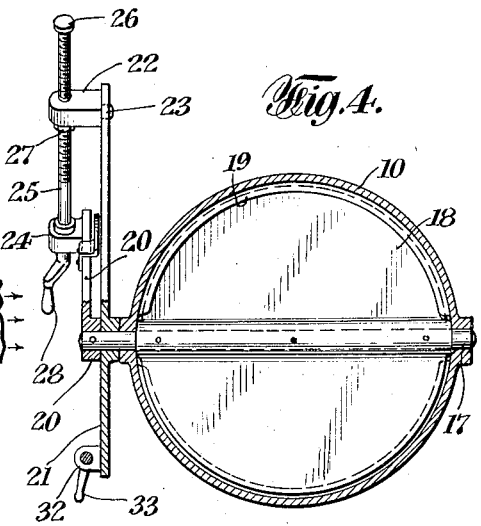
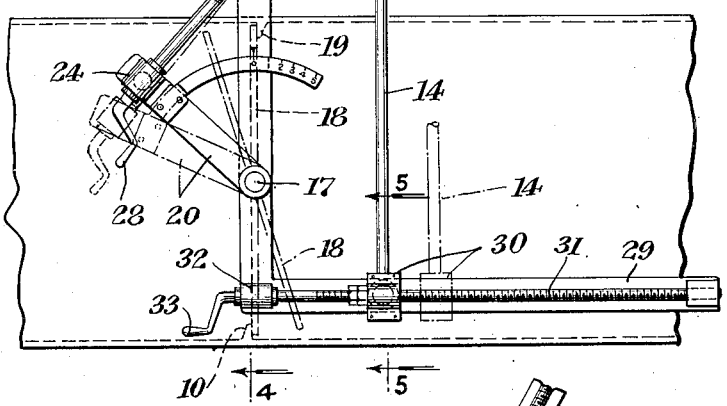
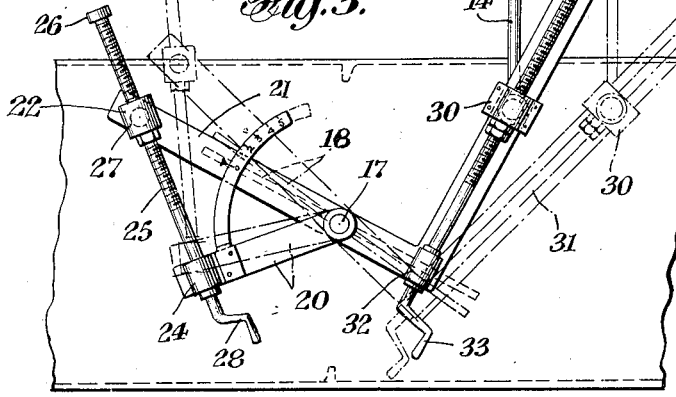
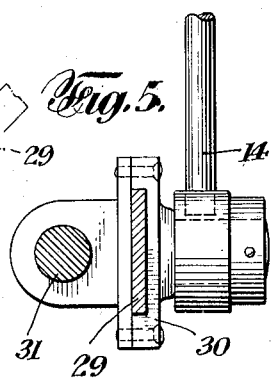
INVENTOR.
Warren D. Lewis
BY
Kenyon & Kenyon
ATTORNEYS.

Patented Nov. 26, 1935

2,022,511

UNITED STATES PATENT OFFICE 2,022,511

DAMPER REGULATOR

Warren D. Lewis, Montclair, N. J.

Application April 3, 1935, Serial No. 14,542

17 Claims. (Cl. 137—139)

This invention relates to damper regulators and more especially to an adjusting attachment for regulating the damper in a forced draft duct of a boiler furnace. It is customary to control such a damper with a conventional damper regulator having a definite length stroke through which it operates to move the damper from full closed to full open position. However, a minimum amount of air is required to maintain combustion and oftentimes full opening of the damper results in excessive air supply.

An object of this invention is a simple and inexpensive attachment by which the damper can be adjusted for any desired minimum open or maximum closed position and for maximum open position resulting from operation of the damper regulator with the movement of the damper between minimum and maximum open positions being proportional to the movement of the damper regulator.

Other objects, novel features and advantages of this invention will become apparent from the following specification and accompanying drawing, wherein:

Fig. 1 is a diagrammatic illustration of a damper-control mechanism equipped with an adjuster embodying the invention;

Fig. 2 is a side elevation with the damper being in minimum open position;

Fig. 3 is a view similar to Fig. 2 with a damper in maximum open position;

Fig. 4 is a section on the line 4—4 of Fig. 2, and

Fig. 5 is a section on the line 5—5 of Fig. 2.

In Fig. 1, 10 indicates the feed pipe of a forced draft duct for a boiler furnace and 11 indicates a regulator having a reciprocating member of definite length stroke, such device being well-known in the art and, therefore, not being described in detail herein. A transmission system composed of rods 12, 13 and 14 and bell-crank levers 15 and 16 extends from the regulator 11 to the pipe 10 for connection to the damper later to be described.

The damper shaft 17 is journalled in the pipe 10 and the damper 18 is fixed thereto. Stops 19 in the pipe are engageable by the damper 18 to limit clockwise rotation thereof. One end of the shaft 17 projects beyond the pipe 10 and has an arm 20 pinned thereto. A member 21 is rotatably mounted on the shaft 17 between the pipe 10 and the arm 20, the shaft extending through the member at a point intermediate the ends of the member 21.

A screw-threaded sleeve 22 is supported at one end of the member 21 by a pivot pin 23 about the axis of which the sleeve 22 is rotatable. A head 24 is pivoted to the end of the arm 20 and in the head 24 is journalled one end of a rod 25, the other end of which is screw-threaded and passes through the sleeve 22, a head 26 and a collar 27 being provided to limit axial movement of the rod 25 relative to the sleeve 22. By rotation of the rod 25 by means of the handle 28, the angular relation between the arm 24 and member 23 and correspondingly the angular relation between the member 23 and the damper 18 may be adjusted.

A bar 29 is integral with or fixed to the remaining end of the member 21 and extends at right angles thereto. A threaded sleeve 30 is slidably mounted on the bar 29 and is connected to the end of the link 14. A rod 31 has one end journalled in a head 32 formed at the lower end of the member 21 and is provided with a handle 33. This rod extends parallel to the bar 29 and passes through the sleeve 30, the rod being screw-threaded for engagement therewith. Rotation of the rod 31 moves the sleeve 30 into different positions of adjustment with respect to the bottom end of the member 21.

Referring now more especially to Figs. 2 and 3, the full line positions of the various elements indicate their position when the damper is set for full closure and full opening upon operation of the reciprocating member in the regulator 11. In Fig. 2 the damper 18 is in contact with the stops 19 and the collar 27 is in engagement with the sleeve 22 and the damper is in alinement with the member 21 which is in vertical position. Operation of the regulator 11 causes the rod 14 to rise through a predetermined distance bringing the member 21 into oblique position and with it the damper 18, as shown in full lines in Fig. 3. When it is desired to set the damper for a certain minimum opening, the rod 25 is rotated to bring the arm 20 into the dot-dash position, shown in Fig. 2 with the damper assuming the dot-dash position also shown in this figure and now, with the member 21 in vertical position, the damper has a certain minimum opening and cannot be closed beyond such position.

The position assumed by the damper 18 at the conclusion of an operating stroke of the regulator may be determined by adjustment of the sleeve 30 on the bar 29. Outward movement of the sleeve on the bar decreases the arc through which the sleeve is moved by a full upward stroke of the rod 14, thus regulating the angular movement of the damper. Thus, the maximum open position of the damper may be adjusted without in any way affecting the minimum open position of the damper. In general, the opening of the damper is greater the nearer the sleeve 30 is brought to the member 21.

The minimum open position of the damper is controlled by the angular relation between the damper and the member 21 while the maximum open position is controlled by the extent of angular movement of the member 21, the extent of its movement being regulated by the position of the sleeve 30 on the rod 29. The sleeve 30 moves between a lower position and upper position, the space between which remains constant. Therefore, the angularity of the arc through which the sleeve 30 moves between said positions decreases with outward movement of the sleeve 30 on the rod 29 with a consequent reduction in the extent of angular movement of the member 21.

It is of course understood that various modifications may be made in the device above described, without in any way departing from the spirit of the invention as defined in the appended claims.

I claim:

1. The combination with a rotatable shaft, of a member rotatably mounted thereon, a second member rigidly mounted thereon, means to vary the angular relation of said members, an arm extending from one of said members at an angle thereto, a slide mounted on said arm, and means to adjust the position of said slide on said arm.

2. The combination according to claim 1 in which said shaft is journalled in a pipe with one end projecting on which are mounted said first and second members, and a damper is fixed to said shaft within said pipe.

3. The combination with a rotatable shaft, of a member rotatably mounted thereon, a second member rigidly mounted thereon, means to vary the angular relation of said members, an arm extending from said first member at an angle thereto, a slide mounted on said arm, and means to adjust the position of said slide on said arm.

4. The combination according to claim 3 in which said shaft is journalled in a pipe with one end projecting on which are mounted said first and second members, and a damper is fixed to said shaft within said pipe.

5. The combination with a rotatable shaft, of a member rotatably mounted thereon, a second member rigidly mounted thereon, a threaded sleeve mounted on one of said members, a threaded rod journalled on the other of said members and passing through said sleeve, an arm extending from one of said members at an angle thereto, a slide mounted on said arm, and means to ad-adjust the position of said slide on said arm.

6. The combination according to claim 5 in which said shaft is journalled in a pipe with one end projecting on which are mounted said first and second members, and a damper is fixed to said shaft within said pipe.

7. The combination with a rotatable shaft of a member rotatably mounted thereon, a second member rigidly mounted thereon, a threaded sleeve mounted on said first member, a threaded rod journalled on said second member and passing through said sleeve, an arm extending from said second member at an angle thereto, a slide mounted on said arm, and means to adjust the position of said slide on said arm.

8. The combination according to claim 7 in which said shaft is journalled in a pipe with one end projectng on which are mounted said first and second members, and a damper is fixed to said shaft within said pipe.

9. The combination with a rotatable shaft, of a member rotatably mounted thereon, a second member rigidly mounted thereon, a threaded sleeve mounted on said first member, a threaded rod journalled on said second member and passing through said sleeve, an arm extending from one of said members at an angle thereto, a slide mounted on said arm, and means to adjust the position of said slide on said arm.

10. The combination according to claim 9 in which said shaft is journalled in a pipe with one end projecting on which are mounted said first and second members, and a damper is fixed to said shaft within said pipe.

11. The combination with a rotatable shaft, of a member rotatably mounted thereon, a second member rigidly mounted thereon, means to vary the angular relation of said members, an arm extending from one of said members at an angle thereto, a slide mounted on said arm, a threaded sleeve carried by said slide and a threaded rod journalled in said member, said rod passing through said sleeve, and constituting means for adjusting the position of said slide on said arm.

12. The combination according to claim 11 in which said shaft is journalled in a pipe with one end projecting on which are mounted said first and second members, and a damper is fixed to said shaft within said pipe.

13. The combination with a rotatable shaft, of a member rotatably mounted thereon, a second member rigidly mounted thereon, a threaded sleeve mounted on one of said members, a threaded rod journalled on the other of said members and passing through said sleeve, an arm extending from one of said members at an angle thereto, a slide mounted on said arm, a threaded sleeve carried by said slide, and a threaded rod rotatably supported by said second member, said rod passing through said sleeve and constituting means for adjusting the position of said slide and said arm.

14. The combination according to claim 13 in which said shaft is journalled in a pipe with one end projecting on which are mounted said first and second members, and a damper is fixed to said shaft within said pipe.

15. The combination with a shaft of a member rotatably mounted thereon, a second member rigidly mounted thereon, a threaded sleeve mounted on said second member, a threaded rod journalled on said first member and passing through said sleeve, an arm extending from one of said members at an angle thereto, a slide mounted on said arm, a threaded sleeve carried by said slide, and a threaded rod rotatably supported by said second member, said rod passing through said sleeve, and constituting means for adjusting the position of said slide and said arm.

16. The combination according to claim 15 in which said shaft is journalled in a pipe with one end projecting on which are mounted said first and second members, and a damper is fixed to said shaft within said pipe.

17. The combination with a rotatable shaft of a member rotatably mounted thereon, a second member rigidly mounted thereon, a threaded sleeve mounted on said first member, a threaded rod journalled on said second member and passing through said sleeve, an arm extending from said first member at an angle thereto, a slide mounted on said arm, a threaded sleeve carried by said slide, and a threaded rod journalled on said member, said rod passing through said sleeve and constituting means for adjusting the position of said slide on said arm.

WARREN D. LEWIS.